United States Patent [19]

Schulz-Hennig et al.

[11] Patent Number: 4,907,077
[45] Date of Patent: Mar. 6, 1990

[54] METHOD AND APPARATUS FOR WHITE BALANCING

[75] Inventors: Joerg Schulz-Hennig, Zurich, Switzerland; Juergen Rohardt, Munich, Fed. Rep. of Germany

[73] Assignee: Dr. Ing. Rudolf Hell GmbH, Fed. Rep. of Germany

[21] Appl. No.: 274,933

[22] PCT Filed: Mar. 11, 1988

[86] PCT No.: PCT/DE88/00140
§ 371 Date: Nov. 8, 1988
§ 102(e) Date: Nov. 8, 1988

[87] PCT Pub. No.: WO88/07305
PCT Pub. Date: Sep. 22, 1988

[30] Foreign Application Priority Data

Mar. 13, 1987 [EP] European Pat. Off. ........ 87103652.1

[51] Int. Cl.⁴ .......................... H04N 9/40; H04N 9/73
[52] U.S. Cl. ......................................... 358/80; 358/75; 358/446; 358/461
[58] Field of Search ................... 358/75, 78, 80, 29 C, 358/446, 461, 466, 475, 489, 490

[56] References Cited

U.S. PATENT DOCUMENTS

| | | |
|---|---|---|
| 4,136,360 | 1/1979 | Hoffrichter et al. |
| 4,563,707 | 1/1986 | Kishida. |
| 4,626,903 | 12/1986 | Giesche et al. ....................... 358/80 |
| 4,639,787 | 1/1987 | Isogai et al. |
| 4,647,981 | 3/1987 | Froelich. |
| 4,649,423 | 3/1987 | Hoffrichter et al. .................. 358/80 |
| 4,843,456 | 6/1989 | Iida et al. ............................. 358/41 |

FOREIGN PATENT DOCUMENTS 0159595 7/1987 Japan.
2148658A 5/1985 United Kingdom.

Primary Examiner—Howard W. Britton
Assistant Examiner—Kim Yen Vu
Attorney, Agent, or Firm—Hill, Van Santen, Steadman & Simpson

[57] ABSTRACT

Process and apparatus for the white balancing of the opto-electrical converters of the scanning elements in reproducers for the point-by-point and line-by-line scanning of black and white documents and color documents. The light from the illuminant of the documents being scanned is converted in the opto-electrical converters into video signal levels or color signal levels, and the sensitivity or amplification of the opto-electric converters is so set that the video signal levels or color signal levels correspond to preset reference signal levels. The inconvenient process of scanning the illuminant of the document to be scanned, in order to obtain the light required for white balance, is replaced by a process by which the light from the scanning light source may be dimmed by means of a regulable iris diaphragm, thus corresponding to the scanning light from the illuminant of the document to be scanned. Adjustment of the iris diaphragm may be interrupted in order to reduce the time of operation, and the resulting inexact light reduction may be compensated for by correcting the reference signal levels.

38 Claims, 5 Drawing Sheets

METHOD AND APPARATUS FOR WHITE BALANCING

BACKGROUND OF THE INVENTION

1. Field of the Invention

The invention refers to the field of electronic reproduction technology and is directed to a method and to an apparatus for white balancing of the scanning elements of reproduction apparatus, particularly of black/-white scanners and color scanners for the production of printing forms.

2. Description of the Prior Art

In a black/white scanner, a black-white original arranged on a rotating scanner drum is scanned point-by-point and line-by-line by a scanner light source and the scan light modulated by the tonal values of the scanned picture elements of the original in a scanner element is converted into an image signal by an opto-electrical transducer, for example by a photomultiplier, this image signal representing the tonal values between "black" and "white". The image signal is then modified according to a prescribed gradation curve whose corner points mark the tonal values "black" and "white" and whose course between the corner points is dependent on the printing parameters for the later printing and on the desired changes in tonal value of the reproduction in comparison to the original. The modified image signal controls the brightness of a recording element that exposes a film point-by-point and line-by-line. The exposed and developed film serves for the production of the printing form for the later printing of the original.

In a color scanner, the scan light acquired by the point-by-point and line-by-line scanning of a color original is split into three color components with dichroitic filters, these color components being converted into color signals by three-opto-electrical transducers. The color signals are likewise modified according to gradation curves and are then converted into the color separation signals in a color correction computer for recording the color separations, the printing forms for the later multi-color printing of the original being prepared from these color separations.

For standardizing the reproduction process, fixed reference signal values referred to as white level and black level are allocated to the corner points of the gradation curve. With reference to the white level, however, what is referred to as a white balancing must see to it that the maximum scan light proceeding from a white normal is always converted into an image signal value in the photomultiplier that corresponds to the normed white level, this being achieved by an appropriate adjustment of the sensitivity or, respectively, of the gain of the opto-electrical transducer.

The brightest image locations (white points) of the originals to be scanned are usually used as white normals in practice, whereby the scan light proceeding from the white point corresponds to the light of the scanner light source attenuated by the respective density value of the white point.

Since the scan light proceeding from the respective white point varies from original to original and dependent on the type of original carrier (film material given transparency originals and photographic paper given opaque originals) and since the sensitivity of the opto-electrical transducers that are employed cannot be kept constant over a longer time span, a white balancing is fundamentally carried out in practice before every original scanning. This white balancing is involved particularly in color scanners since at least three opto-electrical transducers must be balanced therein. In order to keep the time required for the white balancing short in comparison to the actual scan time for the originals, attempts have been made to optimally automate the white balancing.

For example, DE-A-No. 25 45 961 which corresponds to U.S. Pat. No. 4,136,360 discloses such an automatic white balancing. Therein, the scanner element is positioned to the respective white point of the original to be scanned and the scan light proceeding from the white point is converted into an image signal value in the photomultiplier as actual value for a control means. In the control means, the measured actual value is compared to a rated value corresponding to the white level and the sensitivity or, respectively, the gain of the photomultiplier is modified via the supply high-voltage until the actual value corresponds to the rated value.

The known method has the disadvantage that the scan light corresponding to the white normal must be generated by scanning corresponding white points of originals. In order to achieve a precise and reproducible white balancing, the operator must position the scanner element to the white point with optimum precision, even given repetitions of the balancing procedure, this being involved and time-consuming. Added thereto is that a white passage in the original suitable as white point is frequently not present in a colored original or that the brightest passage of the original has a color cast that is not to be compensated in the reproduction.

It is likewise already known to generate the white normal required for the white balancing not by scanning a white point of an original but by scanning a graduated optical wedge applied on the scanner drum, whereby the degree of attenuation of the light of the scanner light source is determined by the selected density value of the graduated optical wedge for simulating the scan light of a white point. The employment of a graduated optical wedge in white balancing is involved and also has the disadvantage that the white balancing can be faulty due to damage to or contamination of the graduated optical wedge.

It is also known to pivot neutral density filters into the beam path of the scanner element for light attenuation in the white balancing. Since even good neutral density filters exhibit differences in spectral transmission, disturbing color displacements can occur given white balancing in color scanners, whereby it is particularly the reproduction of neutral tones that is falsified. The differences in spectral transmission of the grey filters cannot be eliminated by calibration measurements.

It is thus the object of the invention to avoid the said disadvantages of a traditional white balancing and to recite a method and an apparatus with which a fast, more precise and chromatically neutral white balancing can be executed without scanning a white point in an original and without employing graduated optical wedges and neutral density filters.

With respect to the method, this object is achieved by the features of claims 1 and 22 and, with respect to the apparatus, is achieved by the features of claims 14 and 34.

DE-A-No. 34 32 176 which corresponds to U.S. Pat. No. 4,563,707 in fact also discloses a balancing method for the scanner element of a reproduction apparatus;

this, however, is based on a different object. What is involved therein is balancing given different apertures of the scanner diaphragm that are selected in accord with the desired finenesses of scanning and measures that are intended to avoid the destruction of the photomultipliers given an excessively intense light incidence. See also U.S. Pat. Nos. 4,647,981 and 4,639,787.

The invention shall be set forth in greater detail below with reference to FIGS. 1 through 5. Shown are:

DESCRIPTION OF THE PREFERRED EMBODIMENTS

Figure 1:
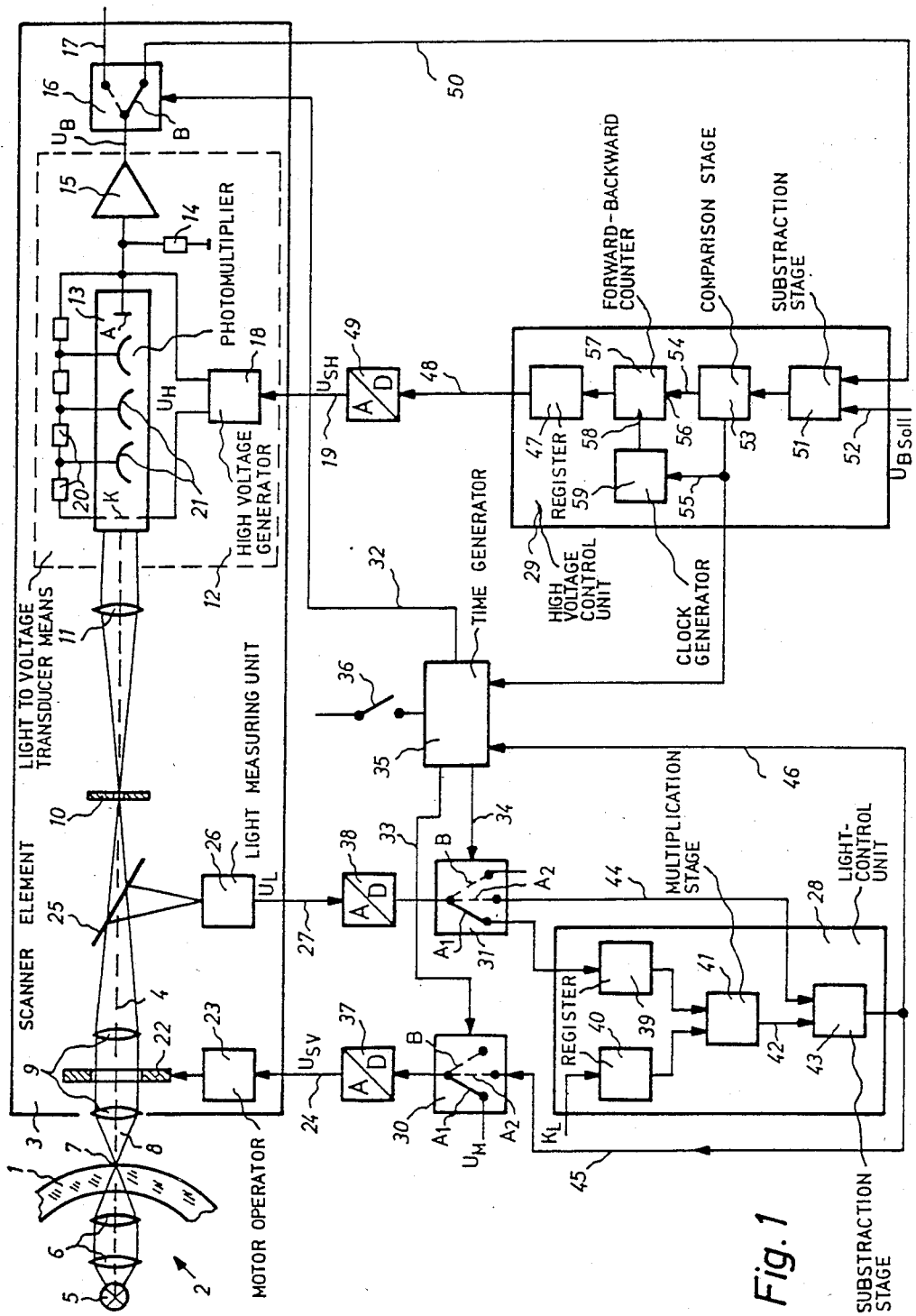
FIG. 1 an exemplary embodiment of an apparatus for automatic white balancing in a black/white scanner element.

FIG. 1 shows an exemplary embodiment of an apparatus for automatic white balancing of a black/white scanner element in a black/white scanner.

Only a scanner drum 1, a scanner illumination 2 and a scanner element 3 along an optical axis 4 are shown in sectional views of the black/white scanner. During the actual scanning of the original, the scanner drum 1 that is manufactured of clear glass accepts the transparency original or opaque original that is to be reproduced. The illustrated scanner illumination 2 for transparency scanning is situated in the inside of the transparent scanner drum 1 and is composed of a light source 5 that, with the assistance of an optics 6, generates a light spot 7 for pixel-by-pixel and line-by-line scanning of the transparency original on the surface of the transparent scanner drum 1 or, respectively, on the transparency original (not shown). Given opaque scanning, the scanner illumination 2 is situated outside of the scanner drum 1. The scan light 8 that has passed through the transparency original or that has been reflected from the opaque original is brightness-modulated according to the density values of the scanned picture elements, whereby the scan light 8 has a maximum value when scanning a bright image location of the original, the white point, and has a minimum value when scanning the darkest image location, the black point. Expressed in other words, the light emitted by the light source 5 experiences the least attenuation in accord with the density values of the white point and experiences the greatest attenuation in accord with the density value of the black point.

The brightness-modulated scan light 9 proceeds into the scanner element 3 and is imaged onto a scanner diaphragm 10 therein by means of a scanner objective 9, the aperture of this scanner diaphragm 10 being selected in accord with the desired scanning fineness in the scanning of the originals. The scanned light 8 limited by the aperture of the scanner diaphragm 10 is cast through a collimation optics 11 onto the light-sensitive surface of a light-to-voltage transducer means 12 whose sensitivity or, respectively, gain is adjustable. In the exemplary embodiment, the light-to-voltage transducer means 12 comprises a photomultiplier 13 that converts the scan light 8 incident on the photocathode K into an anode current at the anode A. The anode current is converted into a voltage by a load resistor 14 connected to grounded potential. The voltage amplified in a following amplifier 15 is the image signal $U_B$ that is supplied via a switch stage 16 and a line 17 to an image signal processing circuit (not shown) of the black/white scanner.

During the scanning of the original, the sensitivity of the photomultiplier 13 has been set such by a preceding white balancing that the image signal $U_B$ corresponds to the reference signal value (white level) when scanning the white point in the original.

A high-voltage $U_H$ required for operation lies between the cathode K and the anode A of the photomultiplier 13, the sensitivity of the photomultiplier 13 being set by varying the gain of this high-voltage $U_H$. The high-voltage $U_H$ is generated in a high-voltage generator. The high-voltage $U_H$ and, thus, the sensitivity of the photomultiplier 13 can be set by a high-voltage control signal $U_{SH}$ that is supplied to the high-voltage generator 18 via a line 19. A voltage divider 20 for the high-voltage $U_H$ is connected between the cathode K and the anode A of the photomultiplier 13. The sub-voltages generated with the voltage divider 20 are conducted to the individual dynodes 21 of the photomultiplier 13.

The structure of the scanner element 3 and its functioning during scanning of originals having been set forth, the white balancing shall now be described, this being respectively implemented preceding the actual scanning of the original at a location on the scanner drum 1 at which no original is situated.

For the implementation of the white balancing of the invention, a controllable light attenuator is situated in the beam path of the scanner element 3 in the proximity of the pupil plane of the scanner objective 9, preferably in the pupil plane. The light coming from the light source 5 is attenuated by an attentuation factor $K_L$ by the light attenuator; this attenuation factor $K_L$ would correspond to the transmissivity of the white point in the transparency original to be reproduced or to the reflectivity of the white point in the opaque original. In this fashion, light having a light power that corresponds to the light power of the scan light emanating from the white point is generated for adjusting the sensitivity of the photomultiplier 13 without white point scanning in the respective original.

An iris diaphragm 22 whose aperture is variable with the assistance of a motor operator 23 is used as controllable light attenuator in the exemplary embodiment. The motor operator 23 is controlled by an adjustment control signal $U_{SV}$ on a line 24 whose amount determines the speed and whose operational sign defines the direction of the adjustment.

A partially transmitting mirror 25 that mirrors a part of the light out onto a light measuring unit 26 is also situated in the beam path of the scanner element 3 between the iris diaphragm 22 and the photomultiplier 13. The light power of the light is measured in the light-measuring unit 26 as a voltage $U_L$ on a line 27.

A light-control unit 28 in which the adjustment control signal $U_{SV}$ for the motor operator 23 is generated on the line 24 is present for controlling the light attenuation of the iris diaphragm 22.

A voltage control unit 29 with which the high-voltage control signal $U_{SH}$ on the line 19 is acquired is provided for setting the sensitivity or, respectively, the gain of the photomultiplier 13. Two switch stages 30 and 31 are also present. The switch stages 16 in the signal path of the image signal $U_B$ and the switch stages 30 and 31—symbolized by switchover means in the figure—are actuated by switching signals on the lines 32, 33 and 34 during the white balancing. The switching signals are acquired in a time generator 35 that is activated at the beginning of the white balancing by actuating a key 36.

The functionings of the individual units during the white balancing shall be set forth in greater detail below.

In a phase A, the light attenuation is first carried out with the assistance of the iris diaphragm 22. To that end, the light incident through the open iris diaphragm 22 is measured with the light-measuring unit 26 as light power $U_{LO}$ in a first step $A_1$. In the case of a transparency scanning, the light power corresponds to the light power of the light source 5 that has passed through the transparent scanner drum 1. In the case of an opaque scanning, it corresponds to the light power of a light source situated above the scanner drum 1 that is reflected by a reflection normal on the scanner drum 1.

The switches of the switch stages 30 and 31 are then situated in the position $A_1$. A digital voltage value $U_M$ is forwarded to the motor operator 23 via the switches of the switch stage 30, via a digital-to-analog converter 37 and via the line 24, whereby the iris diaphragm 22 is fully opened. The light-measuring unit 26 measures the analog light power $U_{LO}$ for the opened iris diaphragm 22, this being digitized in an analog-to-digital converter 38 and being written into a register 39 of the light-control unit 28 via the switches of the switch stage 31. That attenuation factor $K_L$ that corresponds to the transmissivity or reflectivity of the white point of the opaque or transparency original to be reproduced is deposited in a register 40 of the light-control unit 28. Of course, a plurality of registers can also be present in which the attenuation factors $K_L$ for a plurality of originals are deposited, the current attenuation factor $K_L$ for the original that is now to be reproduced being respectively selected therefrom. The transmissivities or reflectivities of the originals to be reproduced are mensurationally acquired at, for example, a work preparation station (AV station) in the course of preparing the originals and are then archived together with other reproduction parameters of the originals. The measured light power $U_{LO}$ for the opened iris diaphragm 22 is multiplied by the attenuation factor $K_L$ in a multiplication stage 41 according to equation (1) in order to obtain the rated light power value $U_{LSoll}$ for the required light attenuation.

$$U_{LSoll} = K_L U_{LO} \qquad (1)$$

The rated light power value $U_{LSoll}$ is supplied to a subtraction stage 43 via a line 42.

In a second step $A_2$ the aperture of the iris diaphragm 22 is reduced in size during continuous measurement of the attenuated light as actual light power value $U_{LIst}$ until the attenuated light corresponds to the rated light power value $U_{LSoll}$. To that end, the switches of the switch stages 30 and 31 are situated in position $A_2$. The measured actual light power value $U_{LIst}$ proceeds via the analog-to-digital converter 38, the switch stage 31 and a line 44 onto the subtraction stage 43 of the light-control unit 28. The difference between the measured actual light power value $U_{LIst}$ and the calculated rated light power value $U_{LSoll}$ is continuously identified in the subtraction stage 43 and is forwarded to the motor operator 23 for the iris diaphragm 22 as adjustment control signal $U_{SV}$ via a line 45, via the switch stage 30, via the digital-to-analog converter 37 and via the line 24. As a result thereof, the aperture of the iris diaphragm 22 is reduced in size until the difference is zero. The difference of zero is signalled to the time generator 35 via a line 46, this time generator 35 switching the switches of the switch stages 30, 31 and 16 into the Position B, as a result whereof the following Phase B is initiated. As a result of the Position B of the switch of the switch stage 30, the motor operator 23 is shut down, whereby the aperture of the iris diaphragm 22 set during Step $A_2$ is fixed for the duration of Phase B.

In Phase B, the adjustment of the sensitivity or, respectively, of the high-voltage of the photomultiplier 13 ensues in such fashion that the light attenuated by the iris diaphragm 22 that corresponds to the scan light of the white point of the appertaining original is converted into an image signal value $U_B$ at the output of the amplifier 15 that corresponds to the reference signal value or white level $U_{BSoll}$.

A digital voltage value that derives from the preceding light balancing is also stored in a register 47 of the high-voltage control unit 29. This digital voltage value is forwarded via a line 48 to a digital-to-analog converter 49 and is converted into an analog high-voltage control signal value $U_{SH}$ there on the line 19 and is supplied to the high-voltage generator 18. The high-voltage $U_H$ is first set to the value of the preceding white balancing with the high-voltage control signal value $U_{SH}$, whereby an image signal value $U_B$ that initially only approximately corresponds to the white level $U_{BSoll}$ arises at the output of the amplifier 15.

The image signal value $U_B$ proceeds via the line 50 to an input of a subtraction stage 51 in the high-voltage control unit 29 as actual image signal value $U_{BIst}$ via a line 50.

The rated image signal value $U_{BSoll}$ corresponding to the white level is supplied to the second input of the subtraction stage 51 via a line 52. The difference between rated image signal value and actual image signal value is continuously formed in the subtraction stage 51 and this difference is supplied to a comparison stage 53. The difference is checked to see whether it is greater or smaller than zero in the comparison stage 53 and a corresponding, first control signal is generated on a line 54. Simultaneously, the comparison stage 53 outputs a second control signal onto a line 55 when the difference is zero. The first control signal on the line 54 goes to the forward/backward control input 56 of a forward-backward counter 57 whose clock input 58 is connected to a clock generator 59. The clock generator 59 generates counting clocks that increment or deincrement the counter reading of the forward/backward counter 57 dependent on the first control signal on the line 54 or, respectively, dependent upon whether the difference is greater or smaller than zero. The momentary counter reading of the forward/backward counter 57 is continuously transferred into the register 47 and the digital-to-analog converter 49 converts it into the analog high-voltage control signal $U_{SH}$ with which the high-voltage $U_H$ or, respectively, the sensitivity of the photomultiplier 13 is varied such that the actual image signal value $U_{BIst}$ measured on the line 50 corresponds to the white level $U_{BSoll}$. The difference identified in the subtraction stage 51 is then equal to zero, the second control signal on the line 55 switches the clock generator 59 off and the counter reading thereby reached in the forward-/backward counter 57 is fixed for the scanning of the reproducible original that will ensue after the white balancing. The end of the white balancing is signalled to the time generator 35 by the second control signal on the line 55, whereby the switch of the switch stage 16 is restored into the broken-line position for the originals scanning and the switches of the switch stages 30 and 31 are restored into the position $A_1$. As a result thereof, the voltage value $U_M$ proceeds to the motor operator 23 that again fully opens the iris diaphragm 22 so that it is ineffective for the scanning of the original.

Figure 2:
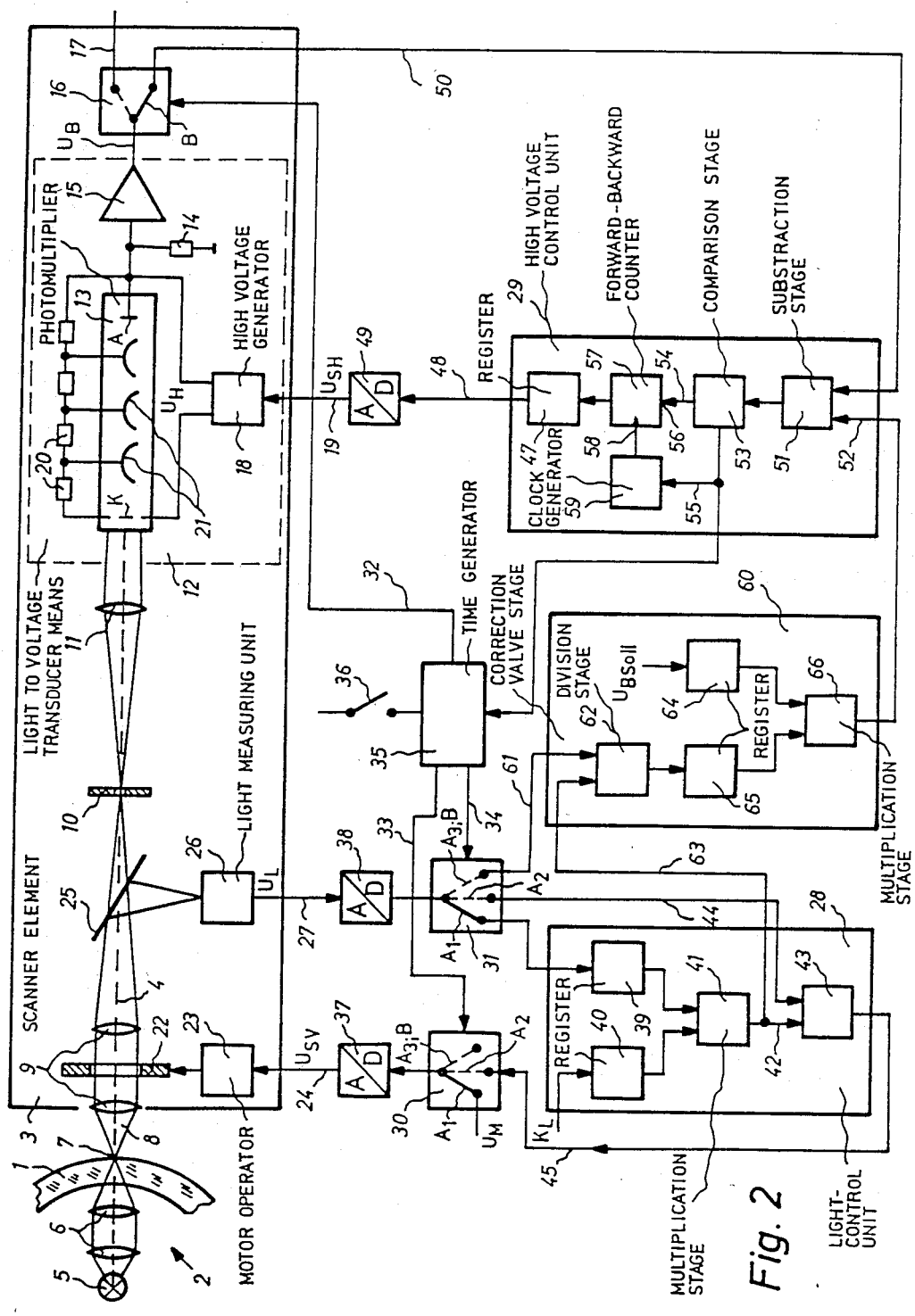
FIG. 2 an improvement of the apparatus of FIG. 1.

FIG. 2 shows a development of the apparatus for automatic white balancing of a black/white scanner element shown in FIG. 1 that differs on the basis of an additional correction value stage 60.

Due to mechanical and/or electromagnetic inadequacies of the iris diaphragm and of the adjustment mechanism, the exact setting of the aperture can frequently last excessively long or the exact adjustment is not even achieved. This can result in an imprecise light attenuation and, thus, in an imprecise white balancing, the reproduction quality suffering thereunder.

In order to increase the precision and the reproducibility of the white balancing, the balancing procedure set forth in FIG. 1 is modified to the affect that the setting of the iris diaphragm 22 during the step $A_2$ is aborted after a prescribed time interval, whereby the light is not exactly attenuated to the calculated rated light power value $U_{LSoll}$ and in that the imprecision of the white balancing caused per se as a result thereof is corrected in phase B during the following high-voltage setting of the photomultiplier 13.

After the prescribed time interval that begins with the start of the diaphragm adjustment in Step $A_2$, the time generator 35 forwards control signals via the line 33 to the switch stage 30 to that end and to the switch stage 31 via the line 34, these control signals ending the step $A_2$ and switching the switches into the position $A_3$.

The switch of the switch stage 30 interrupts the connection between the motor operator 23 and the light-control unit 28 and the adjustment of the iris diaphragm 22 is aborted. In a step $A_3$ following step $A_2$, the light that is incident through the aperture of iris diaphragm 22 that was achieved when the diaphragm adjustment was aborted is measured by the light-measuring unit 26 as light power $U'_L$.

By quotient formation from the measured light power $U'_L$ for the imprecise diaphragm adjustment and the calculated rated light power value $U_{LSoll}$ a correction factor $K_U$ for the exact diaphragm setting is formed in the correction value stage 60 according to equation (2), this being a measure for the imprecise light attenuation due to the aborted diaphragm adjustment.

$$K_U = \frac{U'_L}{U_{LSoll}} \quad (2)$$

To that end, the measured light power $U'_L$ is supplied to the analog-to-digital converter 38 via the line 27 and is supplied to the first input of a division stage 62 in the correction value stage 60 via the switch stage 31 and via a line 61. The rated light power value $U_{LSoll}$ calculated in the light-control unit 28 proceeds to the second input of the division stage 62 via a line 63. For correcting the imprecision of the white balancing that would arise due to the imprecise light attenuation by the iris diaphragm 22, the rated image signal value $U_{BSoll}$ valid for the exact light attenuation is corrected in accord with the calculated correction factor $K_U$ according the equation (3) and the setting of the high-voltage for the photomultiplier 13 is undertaken with the corrected rated image signal value $U'_{BSoll}$.

$$U'_{BSoll} = K_U \cdot U_{BSoll} \quad (3)$$

The corrected rated image signal value $U'_{BSoll}$ is acquired by multiplication of the prescribed rated image signal value $U_{BSoll}$ for the white level that is stored in a register 64 with the correction factor $K_U$ intermediately stored in a register 65, being acquired in a multiplication stage 66 and being supplied to the high-voltage control unit 29 via the line 52. Step $A_3$ is thus terminated and the setting of the high-voltage for the photomultiplier 13 with the corrected rated image signal value $U'_{BSoll}$ in Phase B begins as already extensively set forth in FIG. 1.

In FIGS. 1 and 2, the light is measured with the assistance of a measuring equipment composed of the mirror 25 and the light-measuring unit 26. Since the measuring equipment normally also meets other functions in a scanner that, however, shall not be described in greater detail, the measuring equipment does not represent any additional apparatus outlay with reference to the equipment for white balancing. When, however, the measuring equipment does not assume any other functions, the measuring equipment can be eliminated in that the required light measurements are carried out with the assistance of the photomultiplier 13.

Figure 3:
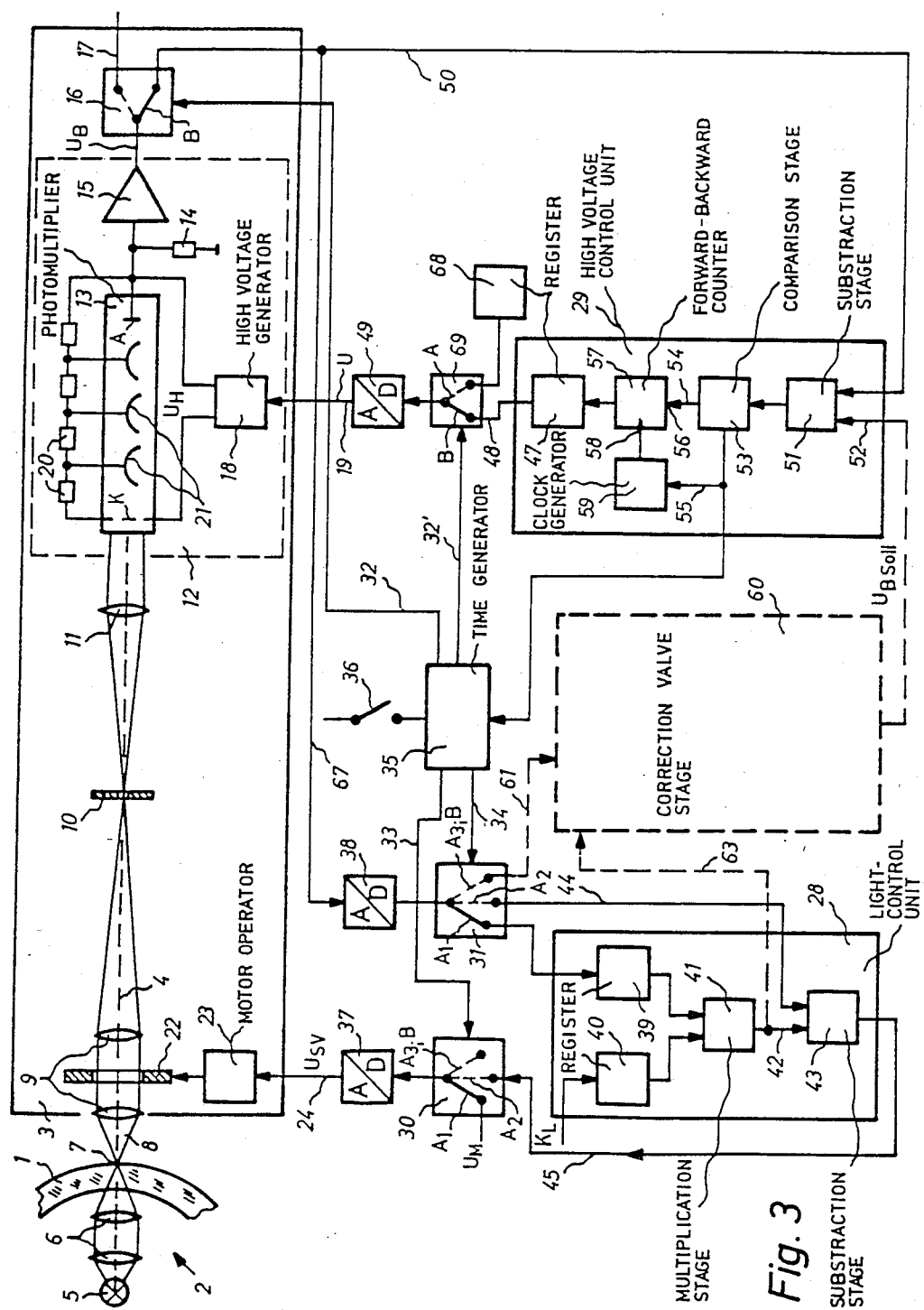
FIG. 3 a modification of the apparatus shown in FIGS. 1 and 2.

FIG. 3 shows an appropriate exemplary embodiment for this purpose that differs from the exemplary embodiments of FIGS. 1 and 2 in terms of circuit technology in the following way.

The mirror 25 and the light-measuring unit 26 are omitted. Instead, the measured light powers $U_L$ are conducted from the output of the amplifier 15 to the analog-to-digital converter 38 via a line 67. For measuring the light power with the photomultiplier 13, the high-voltage $U_H$ thereof is set to a suitable value. A digital value is stored in a further register 68 for this purpose, this digital value being forwarded via a further switch stage 69 to the digital-to-analog converter 49 during the Phase A in which the light attenuation is carried out and being converted there into an analog high-voltage control signal value $U_{SH}$. The switch of the switch stage 69 is thereby situated in position A. The light attenuation in Phase A is executed as already set forth with reference to FIG. 1. The Phase B in which the high-voltage of the photomultiplier 13 is set is initiated by switching the switch stage 69 into the position B. The high-voltage setting is executed as set forth with reference to FIG. 1.

In FIG. 2, the measuring equipment composed of mirror 25 and light-measuring unit 26 was used for measuring the light power and the photomultiplier 13 was used for that purpose in FIG. 3.

In a further exemplary embodiment for an apparatus for white balancing, both the measuring equipment of FIG. 2 as well as the photomultiplier 13 of FIG. 3 can be used for measuring the light power, this being particularly advantageous when the measurement of the light power with the photomultiplier 13 is more exact than with the measuring equipment. In this case, the light power $U_{LO}$ identified by the measuring equipment is utilized for calculating the rated light power value $U_{LSoll}$ in the light-control unit 28, whereas the light powers measured with the assistance of the photomultiplier 13 are used for calculating the correction factor $K_U$ in the correction value unit 60.

Figure 4:
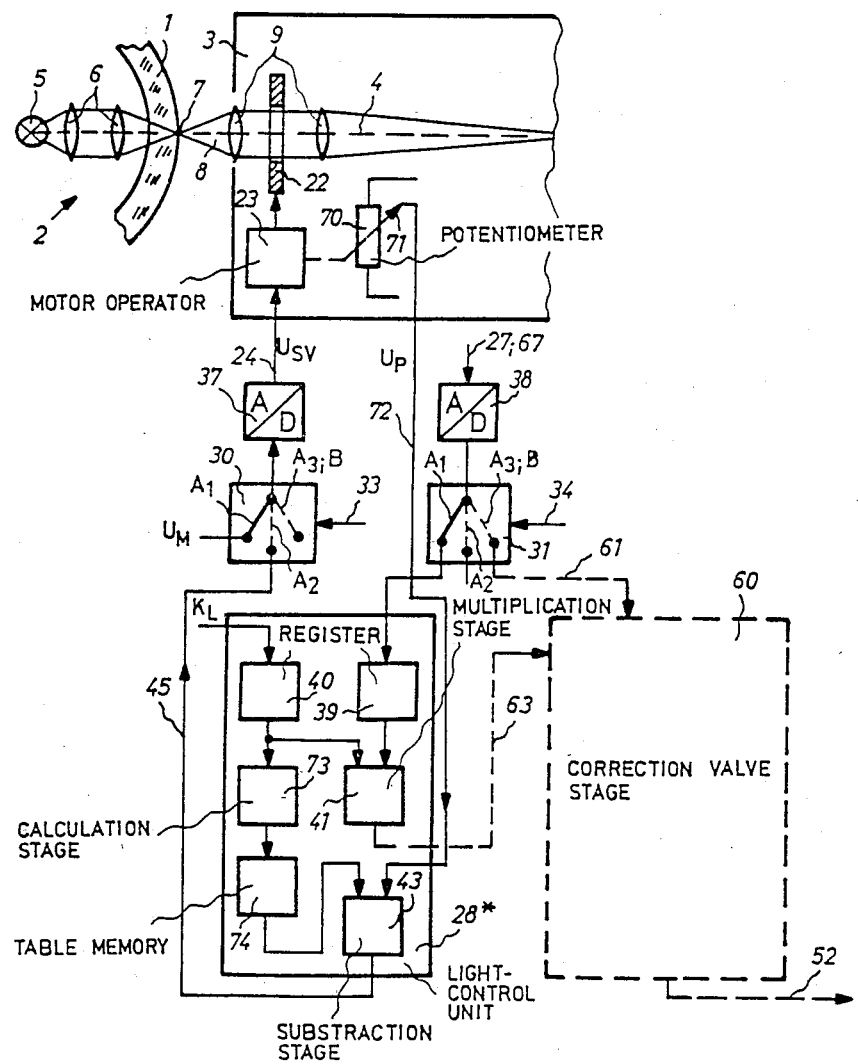
FIG. 4 a further exemplary embodiment for the adjustment of the iris diaphragm.

FIG. 4 shows a modification of the adjustment of the iris diaphragm 22 with the motor operator 23 set forth in FIGS. 1, 2 and 3.

The respective setting of the iris diaphragm 22 is not indirectly identified via the measurement of the light attenuation as set forth in FIGS. 1, 2 and 3 but is directly identified with the assistance of an adjustable potentiometer 70. The tap 71 of the adjustable potentiometer 70 is shifted by the motor operator 23 for the iris diaphragm 22, so that the voltage $U_P$ that is taken is a measure for the respective aperture and can be used as actual value on the line 72 for the adjustment of the iris diaphragm 22 instead of the value measured with the light-measuring unit 26. The modified light-control unit 28* comprises the elements known from the light-control unit 28 such as registers 39 and 40, multiplication stage 41 and subtraction unit 43 and additionally comprises a calculation stage 73 and a table memory 74. The light attenuation factor $K_L$ deposited in the register 40 is converted into a memory address in the calculation stage 73 for the table memory 74, the corresponding rated voltage value $U_{PSoll}$ that must be reached for setting a defined aperture of the iris diaphargm 22 at the adjustable potentiometer 70 being deposited under this memory address. The rated voltage value $U_{PSoll}$ read out from the table memory 74 and the actual voltage value $U_{PIst}$ at the adjustable potentiometer 70 introduced via the line 72 proceed to the subtraction unit 43 in which, as already set forth with reference to FIG. 1, the difference is formed and is forwarded to the motor operator 23 as adjustment control signal $U_{SV}$, being forwarded thereto via the line 45, via the switch stage 30 and via the digital-to-analog converter 37.

Figure 5:
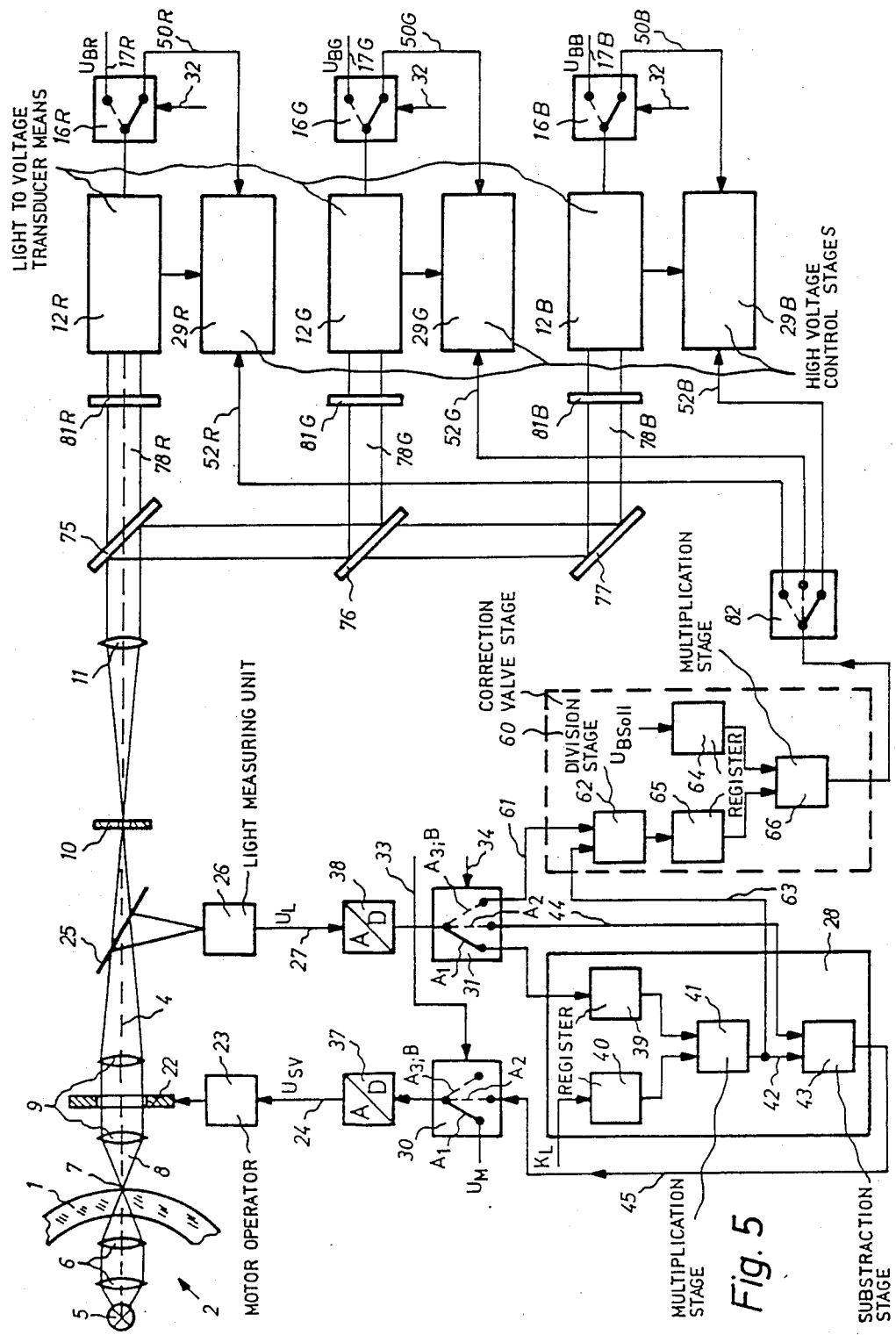
FIG. 5 an exemplary embodiment of an apparatus for automatic white balancing in a color scanning element.

FIG. 5 shows an exemplary embodiment of the means for automatic wire balancing of a color scanner element in a color scanner in a fundamental block circuit diagram. In contrast to the scanner element for black/white scanning shown in FIGS. 1, 2 and 3, the color scanner element comprises a color splitter that dissects the scan light coming from the colored original into the color components and supplies them to separate color channels. The color splitter is composed of color-selective mirrors 75 and 76 and of a mirror 77 with which the chromatic scan light is divided into three sub-bundles 78R, 78G and 78B for the three color channels. Color filters 81R, 81G and 81B for further color separation of the chromatic scan light into the color components "red", "green" and "blue" and light-to-voltage transducer means 12R, 12G and 12B are allocated to the color channels for converting the color components of the scan light into the color signals $U_{BR}$, $U_{BG}$ and $U_{BB}$ that are forwarded via the switch stages 16R, 16G and 16B and via the lines 17R, 17G and 17B to a color signal processing circuit (not shown) of the color scanner. High-voltage control stages 29R, 29G and 29B for setting the sensitivity or, respectively, the gain of the photomultipliers are allocated to the light-to-voltage transducer means 12R, 12G and 12B that in turn comprise photomultipliers.

The actual color signal values $U_{BR}$, $U_{BG}$ and $U_{BB}$ are supplied to the high-voltage control stages 29R, 29G and 29B via the lines 50R, 50G and 50B.

For light attenuation proceeding the color splitting, the iris diaphragm 22, the measuring means composed of mirror 25 and light-measuring unit 26 as well as the light-control unit 28 are provided as in the exemplary embodiment of FIG. 1 and the light attenuation is executed as set forth with reference to FIG. 1. Different light attenuation factors $K_L$ can be loaded into the register 40 of the light-control unit 28 for the individual color channels in case different light attenuations are required for the individual color channels. As in FIG. 3, of course, the measuring equipment in the beam path can be omitted and the measurement of the light power can be carried out with the assistance of the three light-to-voltage transducer means that are present therein.

In case a compensation for color cast is to ensue in the white balancing of the color scanner element, the same rated color signal value is successively supplied via a switchover means 82 and the lines 52R, 52G and 52B to all three high-voltage control units 29R, 29G and 29B, so that the color signal values that have been set are identical in all three color channels and correspond to the white level. When, by contrast, a true-to-color reproduction is desired, correspondingly different rated color signal values are forwarded to the high-voltage control units 29R, 29G and 29B, so that the color signal values that are set are different, whereby one of the color signal values corresponds to the white level. Corresponding to the exemplary embodiment of a black/white scanner element shown in FIG. 2, a correction value stage 60 can also be provided in the color scanner organ, this being merely indicated with broken lines in FIG. 5. Only one rated color signal value for the compensation of the color cast or, on the other hand, different rated color signal values for the individual color channels for true-to-color reproduction are in turn deposited in the register 64 of the correction value stage 60.

As set forth with reference to FIG. 2, the corrected rated color signal values are calculated from the rated color signal values stored in the register 64 and are switched onto the individual color channels via the switchover means 82. In all exemplary embodiments, controlling the gain of some other opto-electrical transducer and/or of a following amplifier also lies within the framework of the invention in the setting of the image signal level or, respectively, color signal level instead of a control of the sensitivity of the photomultiplier via the high-voltage.

We claim:

1. A method for white balancing of the opto-electrical transducer in a scanner element for point-by-point and line-by-line scanning of an original illuminated by a scanner light source and for converting the scan light modulated with the density values of the scanned picture elements into an image signal, wherein for white balancing before scanning of the originals, light is generated with a light power that corresponds to the light power of the scan light proceeding from the brightest location of the original, the white point, and converting the generated light into an image signal value ($U_B$) in the transducer (13), wherein the image signal value ($U_B$) of the white point is measured and compared to a reference signal value ($U_{BSoll}$) that the image signal value of the white point should reach, and wherein the image signal value ($U_B$) of the white point to the reference signal value ($U_{BSoll}$) by varying the sensitivity or, respectively, the gain of the transducer (13), comprising the steps of:

(a) identifying the transmissivity of the white point of a transparency original or the reflectivity of the white point of an opaque original and retaining it as a light attenuation factor ($K_L$);

(b) measuring the light power of the scanner light source (5) and calculating a rated light power value ($UL_{Soll}$) from the measured light power ($U_L$) and from the light attenuation factor ($K_L$), this rated light power value corresponding to the light power of the scan light proceeding from the white point of the original; and (c) attenuating the light of the scanner light source (5) by stopping down and setting the image signal value ($U_B$) acquired by the attenuated light to the reference signal value ($U_{BSoll}$).

2. A method according to claim 1, characterized in attenuating the light of the scanner light source (5) to the rated light power value ($U_{LSoll}$).

3. A method according to claim 1, comprising:
(a) absorbing the attenuation of the light of the scanner light source (5) before the rated light power value ($U_{LSoll}$) is reached;
(b) calculating a correction factor ($K_U$) from the light power of the attenuated light present at absorbing and from the calculated light power value ($U_{LSoll}$); and
(c) correcting the reference signal value ($U_{BSoll}$) for the image signal in accord with the correction factor ($K_U$) and setting the image signal value ($U_B$) generated with the attenuated light to the corrected reference signal value ($U'_{BSoll}$) for compensation of the imprecision caused by the abortion of the light attenuation.

4. A method according to claim 1 or 2 or 3, comprising:
(a) varying the aperture of an iris diaphragm (22) which is arranged in the beam path of a scanner element (3) with a control signal;
(b) measuring the light power ($U_{LO}$) of the scanner light source (5) through the fully opened iris diaphragm (22);
(c) measuring in the light attenuation, the light power ($U_{LO}$) of the light incident through the respective aperture as an actual light power value ($U_{LIst}$), forming continuously the difference between rated light power value ($U_{LSoll}$) and said actual light power value and using it as a control signal for the iris diaphragm (22); and
(d) fully opening the iris diaphragm (22) following the execution of the white balancing.

5. A method according to claim 1 or 2 or 3 wherein said measuring of the light power is carried out with an opto-electrical measuring means (25; 26) arranged in the beam path of the scanner element (3).

6. A method according to claim 1 or 2 or 3 wherein measuring of the light power is executed with a transducer (13).

7. A method according to claim 1 or 2 or 3, comprising:
(a) varying the sensitivity or, respectively, the gain of the transducer (13) with a control signal;
(b) measuring an actual image signal values ($U_{BIst}$) and the given or corrected reference signal value ($U_{Bsoll}$); $U'_{BSoll}$) and deriving the control signal for the sensitivity or, respectively, gain of the transducer (13) from the difference between these signals.

8. A method according to claim 7, comprising:
(a) identifying the respective operational sign of the difference;
(b) increasing or diminishing the control signal for the sensitivity of the transducer (13) dependent on the identified operational sign; and
(c) retaining the control signal value reached given the difference of zero for the later scanning of the original.

9. A method according to claim 8, comprising:
(a) counting clocks into or out of a counter dependent on the identified operational sign of the difference;
(b) converting the respective counter reading into the control signal; and
(c) fixing the counter reading given the difference of zero.

10. A method according to claim 4 comprising, arranging a scanner element (3) with a scanner objective (9) and a scanner diaphragm (10), with the iris diaphragm (22) mounted in the proximity of the scanner objective (9), preferably in the scanner objective.

11. A method according to claim 4 comprising: arranging the opto-electrical measuring means (25; 26) for the light power between the iris diaphragm (22) and the scanner diaphragm (10).

12. A method according to claim 1 or 2 or 3, comprising using a photomultiplier as the transducer (13).

13. A method according to claim 4 comprising:
(a) simultaneously adjusting the aperture of the iris diaphragm (22), and a potentiometer (70), the set voltage value thereof being a measure for the respective actual aperture;
(b) converting the light attenuation factor ($K_L$) into a rated aperture at which the light of the scanner light source (5) is attenuated according to the light attenuation factor ($K_L$); and
(c) forming the difference between rated aperture and actual aperture and using it as control signal for the iris diaphragm (22).

14. Apparatus for white balancing of the opto-electrical transducer of a scanner element for point-by-point and line-by-line scanning of black/white originals, comprising:
(a) a scanner light source (5) for the illumination of the black/white originals;
(b) the scanner element (3) contains a scanner objective (9), a scanner diaphragm (10) and a transducer circuit (13; 15; 16; 18; 49) comprising an opto-electrical transducer for the conversion of the scan light into an image signal ($U_B$),
(c) a circuit arrangement (29) for setting the sensitivity or, respectively, the gain of the transducer circuit (13; 15; 16; 18; 49), a control input thereof being connected to the output of the circuit arrangement (29) and the output thereof being connected to the first input of the circuit arrangement (29), whereby the second input of the circuit arrangement (29) can be supplied with a reference signal value ($U_{BSoll}$) for the image signal ($U_B$),
(d) a light attenuator (22; 23; 37) controllable by a control signal, said light attenuator being arranged in the beam path of the scanner element (3) preceding the scanner diaphragm (10) for attenuating the light of the scanner light source (5) by a prescribable light attenuation factor ($K_L$); and
(e) a light-control circuit (28; 30; 31) whose output is connected to the control input of the light attenuator (22; 23; 37) and whose first input can be supplied with a measured actual light power value ($U_{List}$) and whose second input can be supplied with the prescribable light attenuation factor ($K_L$)

for generating the control signal for the light attenuator (22; 23; 37).

15. Apparatus according to claim 14, wherein a first input of the light-control circuit (28; 30; 31) is connected to the output of the transducer circuit (13; 15; 16; 18; 49).

16. Apparatus according to claim 14, wherein a light-measuring means (25; 26; 28) is arranged in the beam path of the scanner element (3) following the light attenuator (22; 23; 37), and the output of said light-measuring means is connected to the first input of the light-control circuit (28; 30; 31) for measuring the light that has passed through the light attenuator (22; 23; 37).

17. Apparatus according to claim 14 or 15 or 16 comprising, a correction value stage (60) whose inputs are connected to the light-control circuit (28; 30; 31) and whose output is connected to the second input of the circuit arrangement (29), which is connected so as to correct the reference signal value ($U_{BSoll}$) for the image signal ($U_B$).

18. Apparatus according to claim 14 or 15 or 16, wherein the light attenuator comprises an adjustable iris diaphragm (22) and a motor operator (23) for the iris diaphragm (22).

19. Apparatus according to claim 14 or 15 or 16, wherein the light-control circuit comprises a light-control unit (28) that is composed of registers (39; 40), of a multiplier stage (41) and a subtraction stage (43) and also comprises switch stages (30; 31).

20. Apparatus according to claim 14 or 15 or 16, wherein the circuit arrangement (29) comprises a register (47), a subtraction stage (51), a comparator (53), a forward/backward counter (57) and a clock generator (59).

21. Apparatus according to claim 18, wherein the light attenuator additionally comprises a potentiometer (70) which is adjustable with the motor operator (23) for generating a signal that represents the size of the aperture of the iris diaphragm (22).

22. A method for white balancing of the opto-electrical transducer in a color scanner element for point-by-point and line-by-line scanning of a color original illuminated by a scanner light source, for splitting the scan light modulated with the density values of the color original into color components for each color channel and for converting the color components of the color channels into color signals, wherein for white balancing before scanning of the original, light is generated with a light power that corresponds to the light power of the scan light emanating from a brightest location of the color original, the white point, and light is converted into color signal values ($U_B$), wherein the color signal values ($U_B$) of the white point are measured and compared to reference signal values ($U_{BSoll}$) allocated to the individual color channels, these reference signal values being assumed to reached the color signal values ($U_B$) of the white point, and wherein the color signal values ($U_B$) of the white point to the appertaining reference signal values ($U_{BSoll}$) by varying the sensitivity or, respectively, the gain of the opto-electronic transducer (13), comprising the steps of:
(a) identifying the transmissivity of the white point of a transparency original or the reflectivity of the white point of an opaque original and retaining it as a light attenuation factor ($K_L$);
(b) measuring the light power of the scanner light source (S) and calculating a rated light power value ($U_{LSoll}$) from the measured light power ($U_L$) and from the light attenuation factor ($K_L$), this rated light power value corresponding to the light power of the scan light emanating from the white point of the color original; and
(c) attenuating the light of the scanner light source (5) and generating the color signal values ($U_B$) with the attenuated light and setting them to the appertaining reference signal values ($U_{BSoll}$).

23. A method according to claim 22 comprising attenuating the light of the scanner light source (5) to the rated light power value ($U_{LSoll}$).

24. A method according to claim 22, comprising:
(a) absorbing the attenuation of the light of the scanner light source (5) before the rated light power value ($U_{LSoll}$) is reached;
(b) calculating a correction factor ($K_U$) from the light power of the attenuated light present at the absorbing and from the calculated rated light power value ($U_{LSoll}$); and
(c) correcting the reference signal values ($U_{BSoll}$) of the color signals ($U_B$) according to the correction factor ($K_U$) and setting the color signal value ($U_B$) generated with the attenuated light to the corrected reference signal values ($U_{BSoll}$) for the compensation of the imprecision caused by the absorbing of the light attenuation.

25. A method according to claim 22 or 23 or 24, comprising:
(a) carrying out the light attenuation with an assistance of an iris diaphragm (22) arranged in the beam path of the scanner element (3), and varying the aperture of said iris diaphragm with a control signal;
(b) measuring the light power of the scanner light source (5) through the fully opened iris diaphragm (22);
(c) measuring in the light attenuation, the light power of an actual light power value ($U_{LIST}$) incident through the respective aperture, continuously forming the difference between rated light power value ($U_{LSoll}$) and actual light power value ($U_{LIST}$) using it as a control signal for the iris diaphragm (22); and
(d) fully opening the iris diaphragm (22) after the execution of the white balancing.

26. A method according to claim 22 or 23 or 24, comprising making the measurement of the light power with the assistance of an opto-electrical measuring means (25; 26) arranged in the beam path of the scanner element (3).

27. A method according to claim 22 or 23 or 24, comprising making the measurement of the light power with the assistance of one of the transducers (13).

28. A method according to claim 22 or 23 or 24, comprising: for every color channel, (a) varying the sensitivity or, respectively, the gain of the transducer (13) with a control signal; (b) measuring image signal actual values ($U_{BIst}$) forming, the difference between the actual image signal values ($U_{BIst}$) and the prescribed or corrected reference signal values ($U_{BSoll}$; $U_{LSoll}$)) and deriving the control signal for the sensitivity or, respectively, for the gain of the transducer (13) from this difference.

29. A method according to claim 28, comprising, for each color channel:
(a) identifying the respective operational sign of the difference;

(b) increasing or decreasing the control signal dependent on the identified operational sign; and
(c) retaining the control signal value reached at the difference of zero for the later scanning of the original.

30. A method according to claim 28 comprising, in every color channel:
(a) counting clocks into a counter or reading out of the counter dependent on the identified operational sign of the difference;
(b) converting the respective counter reading is converted into the control signal; and
(c) fixing the counter reading at the difference of zero.

31. A method according to claim 25 wherein the color scanner element comprises a scanner objective (9) and a scanner diaphragm (10), comprising arranging the iris diaphragm (22) in the proximity of the scanner objective (9), preferably in the scanner objective.

32. A method according to claim 22 or 23 or 24 comprising, arranging the measuring means (25; 26) between the iris diaphragm (22) and the scanner diaphragm (10).

33. A method according to claim 22 or 23 or 24, comprising, using a photomultiplier as the transducer (13) in every color channel.

34. Apparatus for white balancing an opto-electrical transducer of a color scanner element for point-by-point and line-by-line scanning of color originals, comprising:
(a) a scanner light source (5; 6) for illuminating the color originals,
(b) the color scanner element contains a scanner objective (9), a scanner diaphragm (10), means (75; 76; 77) for splitting the scan light into color channels as well as for every color channel, a color filter for separating the color components and a transducer circuit comprising an opto-electrical transducer (13) for conversion of the color component into a color signal, and
(c) a circuit arrangement (29) in every color channel for setting the sensitivity or, respectively, the gain of the appertaining transducer circuit (13; 15; 16; 18; 49), a control input thereof being connected to the output of the appertaining circuit arrangement (29) and the output thereof being connected to the first input of the circuit arrangement (29), whereby the second input of every circuit arrangement (29) is supplied with a reference signal value ($U_{BSoll}$) for the color signal ($U_B$) of the appertaining color channel,
(d) a light attenuator (22; 23; 37) controllable by a control signal, said light attenuator being arranged in the beam path of the color scanner element before the scanner diaphragm (10) for attenuating the light of the scanner light source (5) by a prescribable light attenuation factor ($K_L$); and
(e) a light-control circuit (28; 30; 31) whose output is connected to the control input of the light attenuator (22; 23; 37) and whose first input receives a measured actual light power value ($U_{LIst}$) and whose second input receives the prescribable light-attenuation factor ($K_L$), for generating the control signal for the light attenuation (22; 23; 37).

35. Apparatus according to claim 34, wherein the first input of the light-control circuit (28; 30; 31) is connected to the output of the transducer means (13; 15; 16; 18; 49) in one of the color channels.

36. Apparatus according to claim 34, wherein a light-measuring means (25; 26; 28) is arranged in the beam path of the color scanner element following the light attenuator (22; 23; 37) the output of said light-measuring means being connected to the first input of the light-control circuit (28; 30; 31).

37. Apparatus according to claim 34 or 35 or 36, wherein a correction value stage (60) is provided with its inputs connected to the light-control circuit (28; 30; 31) and the output optionally connectable to the further inputs of the circuit arrangements (29) in the color channels.

38. Apparatus according to claim 34 or 35 or 36 wherein the light attenuator (22; 23; 37) comprises an adjustable iris diaphragm (22) and a motor operator (23) for the iris diaphragm (22).

* * * * *